May 18, 1943     W. P. LEAR     2,319,463
MECHANICAL ACTUATOR SYSTEM
Filed Dec. 21, 1940     4 Sheets-Sheet 1

INVENTOR
William P. Lear
BY Richard G. Marsen
ATTORNEY

May 18, 1943. W. P. LEAR 2,319,463
MECHANICAL ACTUATOR SYSTEM
Filed Dec. 21, 1940 4 Sheets-Sheet 2

INVENTOR
William P. Lear
BY Richard A. Marsen
ATTORNEY

May 18, 1943.    W. P. LEAR    2,319,463
MECHANICAL ACTUATOR SYSTEM
Filed Dec. 21, 1940    4 Sheets-Sheet 3
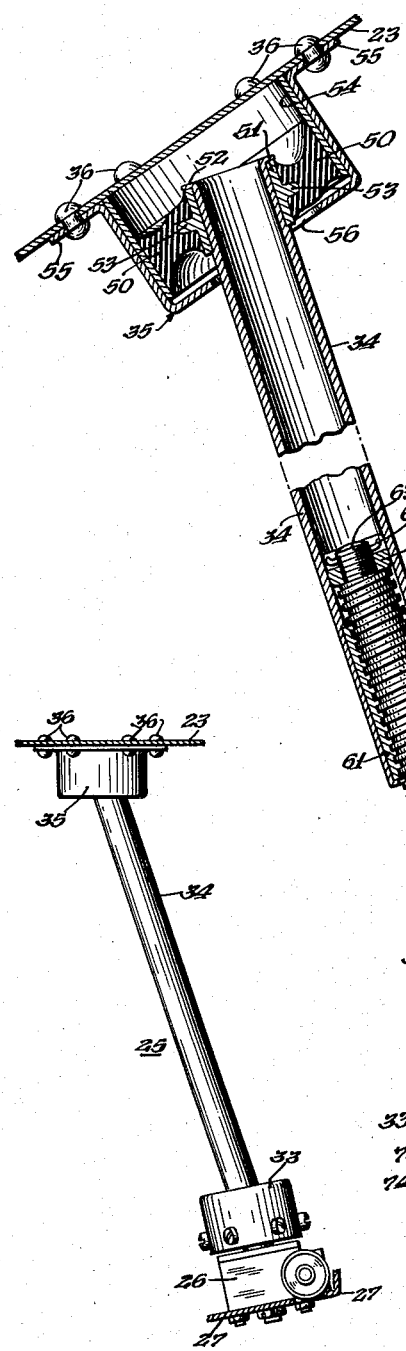
FIG. 7.
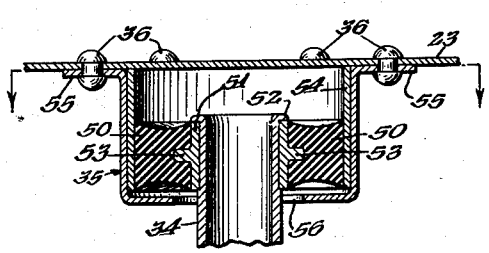
FIG. 9.
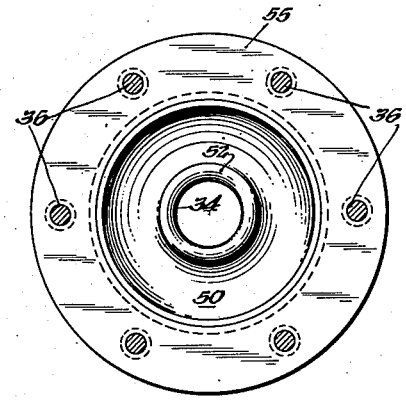
FIG. 10.
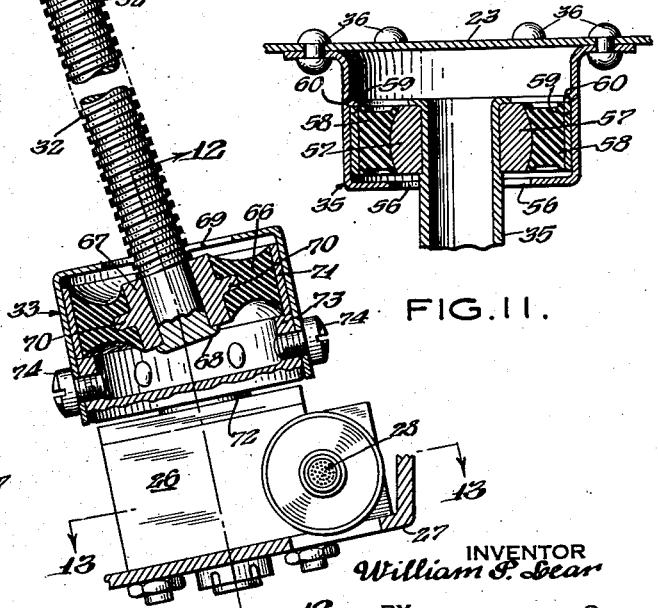
FIG. 11.
FIG. 8.
INVENTOR
William P. Lear
BY Richard G. Marza
ATTORNEY May 18, 1943     W. P. LEAR     2,319,463
MECHANICAL ACTUATOR SYSTEM
Filed Dec. 21, 1940     4 Sheets-Sheet 4

INVENTOR
*William P. Lear*
BY *Richard A. Marsen*
ATTORNEY

Patented May 18, 1943

2,319,463

UNITED STATES PATENT OFFICE 2,319,463

MECHANICAL ACTUATOR SYSTEM

William P. Lear, Dayton, Ohio, assignor, by mesne assignments, to Lear Avia, Inc., Piqua, Ohio, a corporation of Illinois Application December 21, 1940, Serial No. 371,109

16 Claims. (Cl. 244—1)

This invention relates to mechanical actuator systems and more particularly relates to the application of linear actuators for operating angularly displaceable members, such as in remotely operating cowl flaps on the cowl of aircraft engines and other arrangements requiring actuation.

While the invention is capable of general application, it is particularly adapted for operating accessory devices on aircraft, such as cowl flaps, retractable landing gear, wing flaps and other members. In order to illustrate the application of the principles of the invention, the invention will be described particularly as applied to actuating cowl flaps of aircraft engines. Such cowl flaps or hinged windows are provided on the cowl surrounding the engine and are used to control the degree of air flow through the cowl and around the engine. It is desirable that the position of the cowl flaps be remotely controlled from a point adjacent the pilot's seat.

Heretofore, various hydraulic and mechanical arrangements have been used to control the angular position of cowl flaps. In the case of hydraulic controls, recent military experience has shown that they are open to the serious defect that, in the event of breakage of a hydraulic oil line by a bullet or shrapnel, the whole control unit and associated controls are rendered inoperative. Where mechanical actuators were provided, universal or ball bearing joints were used in the control units and the cowl flaps gradually developed vibration due to mechanical instability and wear of the individual flap operating members. The extent of the vibration increased with use, resulting in destruction of the cowl flap control member. Also, the extent of angular movement was limited.

In accordance with the present invention a mechanical cowl flap actuator is provided that is mechanically stable for all positions of its operation. A linear actuator, incorporating a jack screw arrangement, is used between the mechanical driving position and each extensible cowl flap. Flexible mountings are incorporated with the jack screw through which the cowl flap may be operatively extended over a far greater angular swing than was possible with previous devices. The resilient mounting furthermore absorbs vibrational tendencies of the cowl flaps and avoids wear and destruction of the control unit. The resilient portions are normally in tension, further assisting in the absorption of vibrations, and minimize possible loosening or play in the units. The higher vibrational frequencies, which are the more destructive, are particularly absorbed by the arrangement of the invention. The individual jack screw units are connected to a mechanical transmission system arranged concentrically about the motor, resulting in a unified remote mechanical control for all the cowl flaps.

The jack screw units of the invention essentially comprise a screw member, and a cooperative protective sleeve having a long longitudinal nut to assure a rigid relation between the screw and the sleeve when the jack is extended. The non-coacting ends of the screw and sleeve are mounted in annular resilient rubber supports which in turn are mechanically secured to the cowl flap and the mechanical drive gearing. The rubber members are arranged in shearing stress relation for practically all positions to enhance the vibrational absorption characteristics, and afford greater stability to the system. Means are provided to prevent the jack unit from uncoupling in the event the rubber members thereof break in service. Another feature of the invention resides in arranging the protective sleeve of the jack units adjacent the cowl flap, and the screw member well within the cowl adjacent the drive connections. Dust particles and other foreign matter are in this manner carried by the cooling air over the sleeve rather than on the screw member, preventing the screw from becoming clogged.

It is among the objects of the present invention to provide a novel, stable jack screw assembly for controlling the angular position of a member over a relatively wide range.

Another object of the present invention is to provide a novel jack screw control unit for operating a cowl flap.

Still another object of the present invention is to provide a novel mechanical system incorporating individual jack screw units for remotely controlling the degree of extension and retraction of a group of cowl flaps.

A further object of the present invention is to provide a novel jack screw unit for controlling the angular position of a flap or window, incorporating intermediate flexible or shock mounting supports.

A still further object of the present invention is to provide a novel jack screw arrangement with rubber shock mountings at either end for absorbing vibrational stresses and stably operating a cowl flap on an aircraft over relatively wide angular displacements.

These and further objects of the invention will become apparent in the following description of preferred embodiments illustrated in the drawings, in which:

Fig. 7 is an elevational view of the jack when the cowl flap is retracted.

Fig. 8 is an enlarged broken cross-sectional view through the jack when extended.

Fig. 9 is a cross-sectional view through the portion of the jack attached to the cowl flap when in neutral condition.

Fig. 10 is a plan view of the jack end corresponding to Fig. 9 as taken along the line 10—10 thereof.

Fig. 11 is a cross-sectional view through a modification of the portion of the jack corresponding to Fig. 9.

Figure 1:
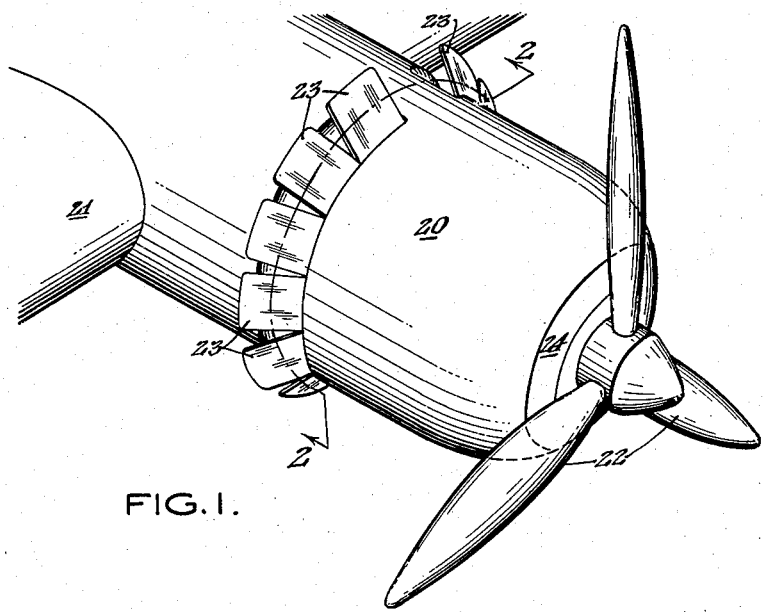
Fig. 1 is a perspective illustration of a portion of an airplane showing a cowl with extended cowl flaps.

The partial airplane view of Fig. 1 shows cowl 20 extending from wing 21 which surrounds an air-cooled combustion engine driving propellor 22. Cowl flaps 23 are circumferentially arranged around a section of cowl 20 in the usual manner. The degree of opening of flaps 23 controls the air flow about the contained engine from the air intake indicated at 24. The degree of opening of the flaps is controlled remotely by the pilot.

Figure 2:
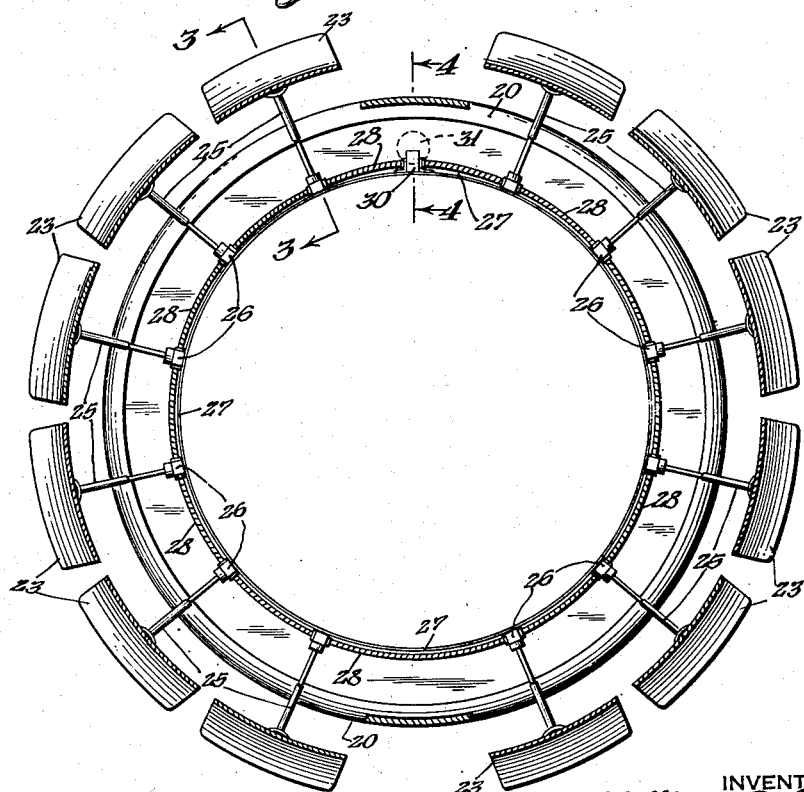
Fig. 2 is a cross-sectional view through the cowl flap assembly of Fig. 1, taken along the line 2—2 thereof.

Fig. 2 illustrates the mechanical interconnection for controlling the extension of flaps 23. An individual screw jack 25 extends between each cowl flap 23 and an associated stationary gear box 26. Gear boxes 26 are supported on a mounting ring 27 within cowl 20. The contained engine is not shown in the drawings since the invention is not concerned with particular features thereof, its relation to the cowl and flaps being well known to those skilled in the art. Flexible shafts 28 interconnect gear boxes 26, forming a continuous mechanical arrangement. A drive gear box 30 is provided for motivating the jacks 25 and associated flaps 23 in unison. The motor drive for the interlinked mechanical system is indicated in Fig. 2 at 31, and shown in more detail in Fig. 4.

Figure 3:
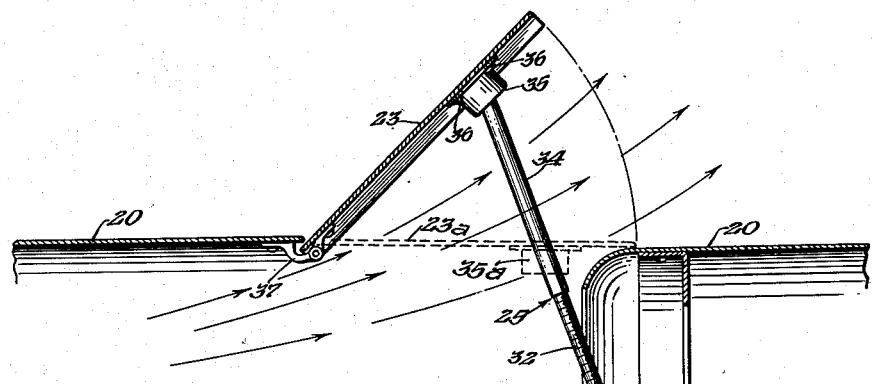
Fig. 3 is a cross-sectional view through an extended cowl flap, showing the cowl flap screw jack of the invention attached therewith.

Rotation of motor 31 in either direction correspondingly rotates interlinked mechanical shafts 28 and the associated gearing within box 26. Fig. 3 is an enlarged cross-sectional showing of the action of a single screw jack 25 on its flap 23. In this figure, cowl flap 23 is shown in its extended condition. Screw jack 25 essentially comprises a screw or threaded member 32 flexibly coupled, in a manner to be described, to gear box 26, through cup 33, and a coacting sleeve or tubular member 34 flexibly coupled to cup 35. Cup 35 is secured to flap 23 by rivets 36. Hinge 37 pivotally supports cowl flap 23 on cowl 20.

When motor 31 is rotated to turn cup 33 and threaded rod 32 in the direction retracting flap 23, sleeve 34 moves over screw 32 and withdraws the flap to closed position. The closed position for the flaps is flush with the surface of cowl 20, as indicated by the dotted line position 23a. Due to the novel flexible relation of the invention, between the elements of jack 25, they reorient themselves while remaining in continuous stable mechanical relation. Flap 23 may thus be stably held in any position intermediate between fully open and retracted, in accordance with remote control by the pilot through motor 31.

An important feature of the invention resides in arranging the jack units 25 with their sleeves 34 in the position adjacent cowl flaps 23 so that air flow from the cowl through the flap opening, indicated by the arrows in Fig. 3, impinges on the sleeves 34 rather than on screws 32. Screw 32 is always well within the cowl adjacent gear box 26, being substantially protected from the forced airflow. Dust, dirt and grit carried by the air stream are in this manner substantially kept from the exposed threaded portion of screw 32. Clogging of the screw jack in service is prevented by the collecting foreign particles impinging on the protective sleeve 34 rather than collecting on the threaded portions of the jack.

Figure 4:
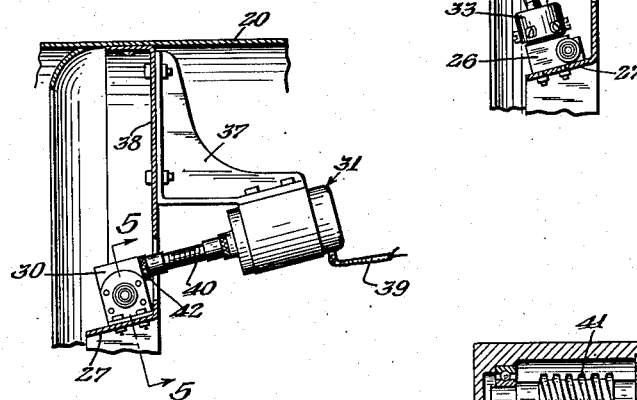
Fig. 4 is a cross-sectional view through the drive for the cowl flaps, taken along the line 4—4 of Fig. 2.
Figure 6:
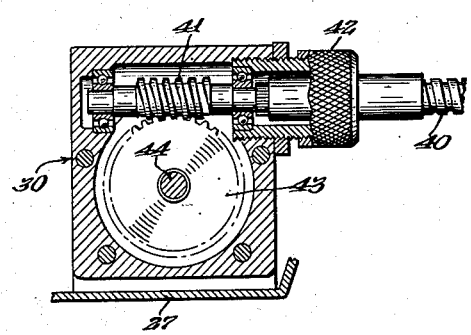
Fig. 6 is a cross-sectional detail through the drive of Fig. 5, taken along the line 6—6 thereof.
Figure 5:
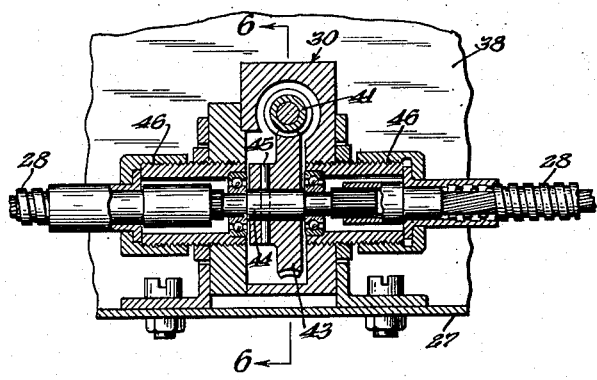
Fig. 5 is an enlarged cross-sectional view through one of the mechanical driving connections for the cowl flaps, taken along the line 5—5 of Fig. 4.

Fig. 4 shows the motive drive arrangement for the system. Motor unit 31 is a reversible electric motor which contains assembled therewith an electromagnetic clutch engageable upon energization of the motor through cable 39 which connects with pilot control switches not shown. Motor unit 31 is supported on bracket 37 which extends from internal cowl frame 38. A remote electromotive drive including a fast stopping clutch such as disclosed in my Patent No. 2,267,114 for "Electromagnetic clutch," which issued on December 23, 1941, is preferred to insure close control movement on the cowl flaps. Drive gear box 30 is coupled to the motor shaft through flexible shaft 40. Figs. 5 and 6 are enlarged cross-sectional views through drive gear box 30. Worm 41 is coupled to flexible shaft 40 through coupling piece 42. Worm gear 43, rotatably supported in roller bearings, meshes with worm 41 for rotation in either direction. Shaft 44 is secured to worm gear 43 by pin 45. The ends of shaft 44 are mechanically coupled to the interconnecting flexible shafts 28 by standard coupling units 46, 46.

An elevational view of the jack in its fully retracted position is shown in Fig. 7. This position corresponds to that indicated by the dotted lines of Fig. 3. When the jack is thus fully retracted, tube 34 fully encloses screw member 32. In this position, the angle which the longitudinal axis of sleeve 34 makes with that of cup 35 is reversed from the corresponding angle effective when the jack is extended. The change of angular relationship is afforded through the resilient coupling members provided within cups 33 and 35 to be described in detail. Despite the varying angular positions between sleeve 34 and its associated cup 35, as well as between screw 32 and its associated cup 33, the jack unit remains mechanically stable and sufficiently rigid for stably holding the cowl flap.

Fig. 8 is an enlarged cross-sectional view through the jack when it is extended, i. e., when its flap 23 is opened. Sleeve 34 is flexibly coupled to cup 35 through resilient member 50 within the cup. A ring 51 is force-fitted to the end of sleeve 34. Rim 52 of tube 34 is swaged over the end of ring 51. An annular ridge 53 extends about ring 51. Annular rubber coupling member 50 is bonded or otherwise cemented to ring 51, enclosing ridge 53. A retainer ring 54 is bonded to the outer surface of resilient member 50, and is press-fitted into cup 35. Cup 35 has an integral annular flange 55 which is attached to the cowl flap through rivets 36.

Sleeve 34 of the jack is accordingly flexibly coupled to the flap through rubber coupling member 50 firmly bonded between the metal parts constituting the remaining elements of the connection. Member 50 is distorted by the stress effective when the jack is in its extended position, as shown in Fig. 7. The stress on rubber coupling 50 is transverse to its radial direction, effecting damping of vibrational forces. An opening 56 in the rim of cup 35 adjacent sleeve 34 permits a relative displacing movement between the cup and sleeve for all positions and conditions of operation of the flap. Ridge 53 is sufficiently wide to prevent the sleeve 34 slipping through opening 56, or its otherwise uncoupling from cup 35 in the event rubber member 50 should break. This is an important safety feature preventing the flap from separating from the jack during flight of the aircraft.

Coupling member 50 is shown in its unstressed or neutral condition in Fig. 9, occurring when the axial direction of sleeve 35 is coincident with that of cup 35. A plan view of coupling flange 55 and member 50 is seen in Fig. 10. Fig. 11 illustrates a modified arrangement for the resilient coupling, corresponding to member 50 of Fig. 9. In place of the annular ridge 51 an annular metal ring 57 of substantial thickness is press-fitted in place on rod 34. The outer surface of ring 57 is curved, and rubber member 58 is bonded thereto. The retaining ring 59 is shorter than that of Fig. 9, it being held in position by stakes 60. Ring 57 is sufficiently thick to prevent sleeve 34 from sliding through opening 56 of cup 35; and its curved reduced end width permits full resilient action by member 58.

Screw 32 coacts with sleeve 34 through a screw nut 61 in the sleeve as shown in Fig. 8. Nut 61 is made of tough material and with an extended surface. A suitable material for the screw nut is Tobin bronze. Screw nut 61 is set into a socket in sleeve 34, and is retained in place by coining-over edge 62 of the sleeve. A preferable method for securing nut 61 in position is to heat the end of sleeve 34 red hot, and coin-over its end 62 after the nut has been shrunk into position. Screw 32 is assembled within extension sleeve 34 by threading it through nut 61 from the open end of tube 34 until the threaded part 63, of reduced section, projects through the opposite open end of the sleeve in cup 35.

A nut 64 is then threaded onto projection 63. The diameter of nut 64 is the same as the inside diameter of sleeve 34 as shown in Fig. 8. A safety wire 65 is assembled therewith to insure the position of nut 64 on the jack screw. In view of the smaller inside diameter of screw nut 61, nut 64 will abut the screw nut 61 to prevent "pull-out" of screw 32 from sleeve 34. A smooth coaction and relative movement between screw 32 and extension tube 34 is afforded by the screw nut 61, preferably of substantial length, holding the screw and sleeve in rigid alignment for all the positions of the jack. Relative yielding of the jack parts takes place solely at the resilient mounting members within cups 33 and 35.

The resilient coupling within cup 33 for screw 32 comprises rubber ring 66 which is similar to ring 50 within cup 35. A metal ring 67 is force-fitted onto the end 68 of screw 32, and the end is staked over. An annular ridge 70 extends from ring 67 having an outside diameter sufficient to prevent uncoupling of screw 32 from cup 33 through widened opening 69. Rubber member 66 is bonded to both ring 67 and retaining ring 71. Retaining ring 71 is press-fitted into and otherwise secured with cup 33. Cup 33 is rotatably operated by reduction gear box 26 through shaft 72 extending therefrom. Shaft 72 is integral with cap 73 onto which screws 74 secure cup 33. A positive drive connection is thus afforded between screw 32 and shaft 72 which is in turn coupled to mechanical driving cable 28 through gear unit 26. Resilient rubber mounting unit 66 is normally in stress relation, such as indicated in Fig. 8, for all operating positions of the jack screw. This stressed relation further absorbs vibrational forces on the cowl flap, insuring stability and longer life in service.

Figure 12:
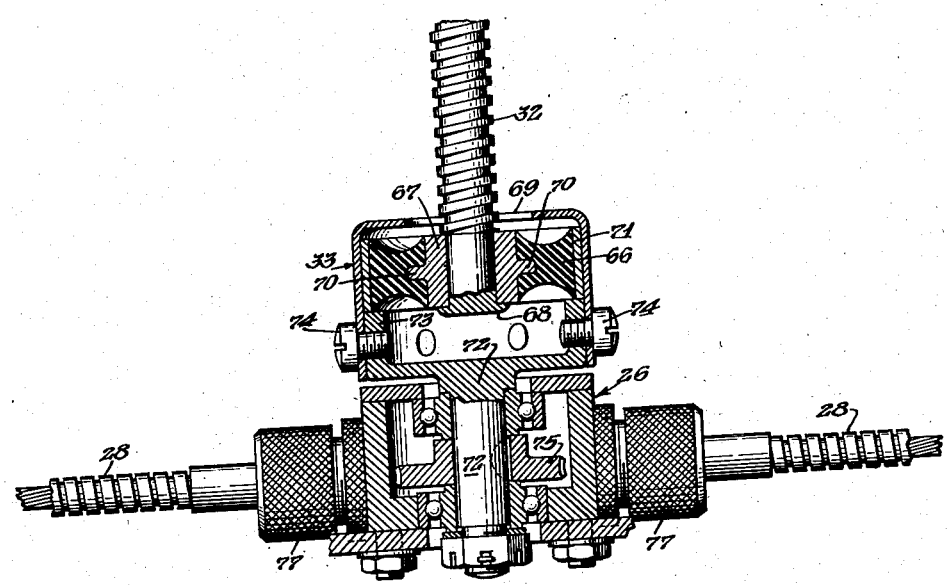
Fig. 12 is a cross-sectional view through the driven portion of the screw jack in neutral condition, and associated mechanical driving connections, corresponding to the view taken along the line 12—12 in Fig. 7.
Figure 13:
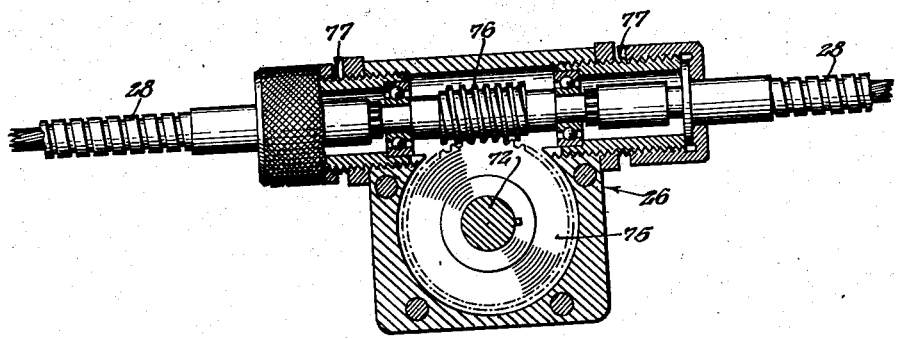
Fig. 13 is a cross-sectional view through the gearing connections of the jack, taken along the line 13—13 of Fig. 7.
Figure 14:
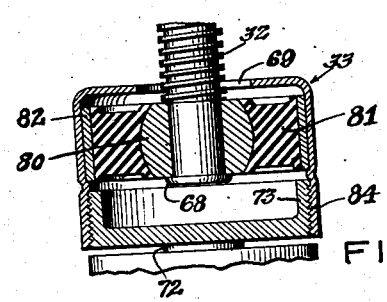
Fig. 14 is a cross-sectional view through a modified form for the portion of the jack corresponding to Fig. 12.

Figs. 12 and 13 show screw 32 in the position perpendicular to the plane of cup 33 with resilient member 56 in its neutral position, as well as details of the gear box 26. Shaft 72 of the gear unit is keyed to worm gear 75, and is rotatably mounted in ball bearings supported in the gear box. A worm 76 also mounted in ball bearings, engages with worm gear 75 and is driven in either direction of rotation by cables 28, 28 through suitable coupling units 77, 77. Fig. 14 is a modified form for the resilient coupling within cup 33 for screw 32. This form is equivalent to the mounting in Fig. 11. An annular ring 80 with a bulging central curved portion is force-fitted onto screw 32, the end 68 of which is swaged over. The resilient rubber ring 81 is bonded with ring 80, and in turn secured with ring 82 which is force-fitted into cup 33.

Screw 32 is thus resiliently supported with respect to cup 83 and is angularly displaceable with respect thereto, within the concentric opening 69. Extending portion 84 of cup 33 is threaded onto cupped extension 73 of drive shaft 72. Screw 32 is thus rotatably controlled, directly and in a positive drive relationship, by shaft 72 which is in turn driven through gearing unit 26 by cables 28. The diameter of annular ring 80 is designed to prevent screw 32 from falling through opening 69 in the event rubber member 81 slips off the ring. In the latter event the attached cowl flap is held in approximate control, avoiding damage which might otherwise result.

An important advantage of the jack screw assembly of the invention resides in the resilient mounting supports. Vibration of the cowl flaps, inherent in the operation of the aircraft, are absorbed by these mountings, particularly, the rubber annular members within cups 33 and 35 at either end of the jack screw assemblies 25. The particularly destructive high frequency vibrations are effectively dampened. Jack screws 25 stably hold the cowl flaps in any angular position, and remain unharmed in service. No loosening or play develops in the jack screw units due to wear or mechanical displacements. It is to be understood that modifications of the disclosed embodiments may be practiced without departing from the broader spirit and scope of the invention as defined in the appended claims.

What is claimed is:

1. A jack device for controlling the position of an object to be displaced with respect to a support including a member adapted to be secured to the object, a screw element, a resilient rubberlike body connecting one end of said element with said member, yieldable means for flexibly coupling the other end of said element with respect to the support, and gear means associated with said element for operating the same to correspondingly displace said object with respect to the support, said resilient body yielding to permit realignment of the screw element with respect to the displaced object and normally remaining in a stressed shear condition to stably hold the object in its displaced position and absorb vibrational forces thereon.

2. A jack device for controlling the position of an object to be displaced with respect to a body including a member adapted to be secured to the object, a screw element, a threaded sleeve element in longitudinal engagement with said screw element, a first resilient annular body connecting the outer end of one of said elements with said member, a second resilient annular body for flexibly coupling the other one of said elements with respect to said body, drive means in operative engagement with one of said elements for controlling the relative engagement of said elements to correspondingly adjust the displacement of the object with respect to the body, said resilient bodies yielding to permit reorientations of said elements with respect to the object while normally remaining in a stressed condition for the various displacements of the object.

3. A jack device for controlling the position of a member to be displaced with respect to a support including a screw element, a threaded sleeve element in longitudinal engagement with said screw element, a coupling piece adapted to be secured to the member, an annular rubberlike body connecting the unengaged end of one of said elements with said coupling piece, gear means adapted to be mounted on said support, and yieldable means coupling the unengaged end of the other one of said elements with said gear means, the longitudinally engaged elements being variably aligned with respect to the member in correspondence with the relative position of its displacement from the support, said annular rubber body being arranged to be normally stressed transversely of its radial direction for the various positions of the member for stably holding the member in position and absorbing vibrational forces therein.

4. A jack device for controlling the position of a member to be displaced with respect to a mounted drive unit including a screw element, a threaded sleeve element in longitudinal engagement with said screw element, a coupling piece adapted to be secured to the member, an annular rubber-like body connecting the unengaged end of one of said elements to said coupling piece, a second coupling piece adapted to be secured to the drive unit, and a second annular rubber-like body connecting the unengaged end of the other of said elements with said second coupling piece, the relative engagement of said elements being controlled by the drive unit for correspondingly altering the displacement of the member with respect to the support, said annular bodies yielding to permit realignment of the longitudinally engaged elements with respect to the member for stably holding the member in its various positions.

5. A jack device for controlling the position of an object to be displaced with respect to a support including a member adapted to be secured to the object, a sleeve element formed with a socket in one end, an elongated nut secured in said socket, a resilient rubber-like body connecting the other end of said sleeve with said member, a screw element operatively associated with said nut, yieldable means for flexibly coupling the outer end of said screw element with respect to said support, and gear means associated with said elements for controlling their relative engagement to correspondingly displace said object with respect to said support, said resilient rubber-like body yielding to permit realignment of the jack device with respect to the displaced object and normally remaining in a stressed shear condition to stably hold the object in its displaced position and absorb vibrational forces thereon.

6. A jack device for controlling the position of an object to be displaced with respect to a support, including a cup adapted to be secured to the object and having an opening in its rim, an annular rubber-like body secured in said cup, a threaded sleeve, a ring secured to one end of said sleeve and formed with a radially projecting ridge, said ring being secured to said annular rubber-like body, and the external diameter of said ridge being greater than the diameter of said rim opening whereby to prevent disengagement of said sleeve from said cup member in the event of failure of said annular rubber-like body, a screw element in longitudinal engagement with said threaded sleeve, a resilient rubber-like body connecting the outer end of said screw element with said support, gear means associated with said elements for controlling their relative engagement to correspondingly displace said object with respect to said support, said resilient body and said rubber-like body yielding to permit realignment of the engaged elements with respect to the displaced object and normally remaining in stressed shear condition to stably hold the object in its displaced position and absorb vibrational forces thereon.

7. In a control system for a member hingedly mounted aboard an aircraft, a jack including a screw element, a threaded sleeve element in longitudinal engagement with said screw element, a part adapted to be secured to the member, a resilient rubber body connecting said part with one of said elements, yieldable means flexibly coupling the other of said elements with respect to the aircraft, and drive means connected to said elements for longitudinally displacing them with respect to each other and correspondingly controlling the angular settings of the member relative to the aircraft, said elements being adjustably aligned with respect to the member with said resilient body being normally stressed transversely of its radial direction for stably holding the member at its various angular settings.

8. In a control system for a member hingedly mounted on an aircraft, a jack including a screw element, a threaded sleeve element in longitudinal engagement with said screw element, a first annular resilient body connecting the end of one of said elements with said member, a second annular resilient body flexibly supporting the other of said elements with respect to a fixed portion of the aircraft, and gear means in driving engagement with said elements for longitudinally displacing them to control the angular settings of the member, said resilient bodies yielding to permit realignment of said elements with respect to the member and normally remaining in a stressed shear condition to stably hold the member at its various angular settings and absorb vibrational forces thereon.

9. In a control system for an aircraft cowl flap wherein the flap is hinged for movement from a position generally at the surface of the aircraft outwardly to an angular position with respect to the aircraft surface, a jack screw, a member adapted to be secured to the flap, a resilient rubber-like body connecting one end of said jack screw with said member, drive means adapted to be supported from a fixed portion of the aircraft, and yieldable means coupling the other end of said jack screw with said drive means, the angular settings of the flap being controlled by the operation of said drive means on said jack screw; said jack screw being adjustably aligned with respect to the flap, with said resilient body being normally stressed in shear for stably holding the flap at its various angular settings and absorbing vibrational forces thereon.

10. In a control system for an aircraft cowl flap wherein the flap is hinged for movement from a position generally at the surface of the aircraft outwardly to an angular position with respect to the aircraft surface, a jack including a screw element, a threaded sleeve element in longitudinal engagement with said screw element, a member secured to the flap, a resilient rubber-like body connecting the end of one of said elements with said member, gear means operatively coupled with said elements and adapted to be supported from a fixed portion of the aircraft to control the angular settings of the flap through said elements, said resilient body yielding to permit said elements to be adjustably aligned with respect to the flap and normally remaining stressed transversely of its radial direction for stably holding the flap at its various angular settings and absorbing vibrational forces thereon.

11. In a control system for an aircraft cowl flap wherein the flap is hinged for movement from a position generally at the surface of the aircraft outwardly to an angular position with respect to the aircraft surface, a jack including a screw element, a threaded sleeve element in longitudinal engagement with said screw element, a member adapted to be secured to the flap, a resilient rubber-like body connecting the outer end of one of said elements with said member, drive means adapted to be supported from a fixed portion of the aircraft, and yieldable means coupling the outer end of the other of said elements with said drive means, the angular settings of the flap being controlled by the operation of said drive means on said elements, said elements being adjustably aligned with respect to the flap with said resilient body being normally stressed in shear for stably holding the flap at its various angular settings and absorbing vibrational forces thereon.

12. In a control system for an aircraft cowl flap wherein the flap is hinged for movement from a position generally at the surface of the aircraft outwardly to an angular position with respect to the aircraft surface, a jack including a screw element, a threaded sleeve element in longitudinal engagement with said screw element, a member adapted to be secured to the flap, a resilient rubber-like body connecting the outer end of one of said elements with said member, drive means adapted to be supported from a fixed portion of the aircraft, and yieldable means coupling the outer end of the other of said elements with said drive means, the angular settings of the flap being controlled by the operation of said drive means on said elements, said elements being adjustably aligned with respect to the flap with said resilient rubber-like body being normally stressed in shear for stably holding the flap at its various angular settings and absorbing vibrational forces thereon, a nut disposed in said sleeve element and removably secured to the end of said screw element, said nut being larger in diameter than said screw element to limit the longitudinal displacement of said screw element relative to said sleeve element.

13. In a control system for an aircraft cowl flap wherein the flap is hinged for movement from a closed position generally at the surface of the aircraft outwardly to open angular positions with respect to the aircraft surface, a jack including a screw element, a threaded sleeve element in longitudinal engagement with said screw element, a member secured to the flap, a first resilient body connecting one of said elements with said member, a second resilient body flexibly coupling the other of said elements with respect to a fixed part of the aircraft, said elements being arranged in a non-perpendicular angular relation with respect to the flap when it is in its closed position with said resilient bodies being stressed in shear, and drive means associated with said elements for altering their relative engagement to correspondingly control the angular setting of the flap, at least one of said resilient bodies yielding to permit angular reorientation of said elements with respect to the flap and normally remaining in a stressed shear condition for the various angular settings of the flap.

14. In a control system for an aircraft cowl flap wherein the flap is hinged for movement from a closed position generally at the surface of the aircraft outwardly to open angular positions with respect to the aircraft surface, a jack including a screw element, a threaded sleeve element in longitudinal engagement with said screw element, a member secured to the flap, a first resilient body connecting one of said elements with said member, a second resilient body flexibly coupling the other of said elements with respect to a fixed part of the aircraft, said elements being arranged in a non-perpendicular angular relation with respect to the flap when it is in its closed position with said resilient bodies being stressed in shear, and drive means associated with said elements for altering their relative engagement to correspondingly control the angular setting of the flap, said resilient bodies yielding to permit angular reorientation of said elements with respect to the flap and normally remaining in a stressed shear condition for the various angular settings of the flap.

15. In a control system for an aircraft cowl flap wherein the flap is hinged for movement from a closed position generally at the surface of the aircraft outwardly to open angular positions with respect to the aircraft surface, a jack including a screw element, a threaded sleeve element in longitudinal engagement with said screw element, a member secured to the flap, a first resilient body connecting one of said elements with said member, a second resilient body flexibly coupling the other of said elements with respect to a fixed part of the aircraft, said elements being arranged in a non-perpendicular angular relation with respect to the flap when it is in its closed position with said resilient bodies being stressed in shear, and drive means associated with said elements for altering their relative engagement to correspondingly control the angular setting of the flap, said resilient bodies yielding to permit angular reorientation of said elements with respect to the flap and normally remaining in a stressed shear condition for the various angular settings of the flap, and means secured to each of said elements and to said resilient bodies and adapted to engage said member and said fixed part of the aircraft, respectively, in the event of failure of either of said resilient bodies, to prevent disengagement of said elements from said member and said fixed part, respectively.

16. In a control system for an aircraft cowl flap wherein the flap is hinged for movement from a position generally at the surface of the aircraft outwardly to an angular position with respect to the aircraft surface to control the egress of air through the cowl and around the engine, a jack including a screw element and a threaded sleeve element in longitudinal engagement with said screw element, a member adapted to be secured to the flap, a resilient rubber-like body connecting the outer end of the sleeve element with said member, drive means adapted to be supported from a fixed interior portion of the aircraft, and yieldable means coupling the outer end of said screw element with said drive means, the angular settings of the flap being controlled by the operation of said drive means on said elements, said elements being adjustably aligned with respect to the flap with said resilient body being normally stressed in shear for stably holding the flap at its various angular settings and absorbing vibrational forces thereon; the length of said sleeve element being such that, when the cowl flap is in its fully open position, substantially only said sleeve element is disposed in the path of air flowing outwardly from said aircraft, whereby said screw element is substantially protected from such forced airflow.

WILLIAM P. LEAR.